United States Patent [19]

Wright

[11] Patent Number: 5,206,990
[45] Date of Patent: May 4, 1993

[54] METHOD FOR ASSEMBLING SERPENTINE HEAT EXCHANGERS

[75] Inventor: William D. Wright, Lyndonville, N.Y.

[73] Assignee: General Motors Corporation, Detroit, Mich.

[21] Appl. No.: 752,122

[22] Filed: Aug. 29, 1991

[51] Int. Cl.⁵ .............................. B23P 15/26
[52] U.S. Cl. .................. 29/890.047; 29/726; 29/727; 29/890.046
[58] Field of Search ............ 29/726, 727, 890.043, 29/890.047, 428, 890.046, 450

[56] References Cited

U.S. PATENT DOCUMENTS

| | | | |
|---|---|---|---|
| 1,339,434 | 5/1920 | Coffelder | 29/727 |
| 2,154,855 | 4/1939 | Lear | 29/726 |
| 4,486,933 | 12/1984 | Iwase et al. | 29/726 |
| 4,587,701 | 5/1986 | Koisuka | 29/157.3 |
| 4,611,375 | 9/1986 | Zapawa | 29/157.3 |
| 4,637,132 | 1/1987 | Iwase | 29/726 |
| 4,942,654 | 7/1990 | Wright | 29/890.035 |
| 5,014,422 | 5/1991 | Wallis | 29/727 |
| 5,029,382 | 7/1991 | Breda et al. | 29/726 |

Primary Examiner—Irene Cuda
Attorney, Agent, or Firm—Ronald L. Phillips

[57] ABSTRACT

A serpentine heat exchanger tube structure is formed with spaces between opposite runs of the tube structure that are smaller than the fins which must be inserted into the spaces. The tube structure is pressed onto a series of spreader blades at a fin inserting station to spread the runs of the tube structure, the fins are loaded into a series of compartments of a shuttle at a remote fin loading station, the shuttle is moved to the fin inserting station to position the compartments opposite the respective spaces of the tube structure on the side of the tube structure opposite the side from which the spreader blades entered, and a series of insertion blades are moved into the compartments to move the fins out of the compartments and into the tube spaces as the spreader blades are simultaneously withdrawn. Timing pins associated with the insertion blades engage timing pins associated with the spreader blades so that the spreader blades are moved in unison with the insertion blades to avoid crushing the fins between the blades during the fin insertion process.

9 Claims, 7 Drawing Sheets

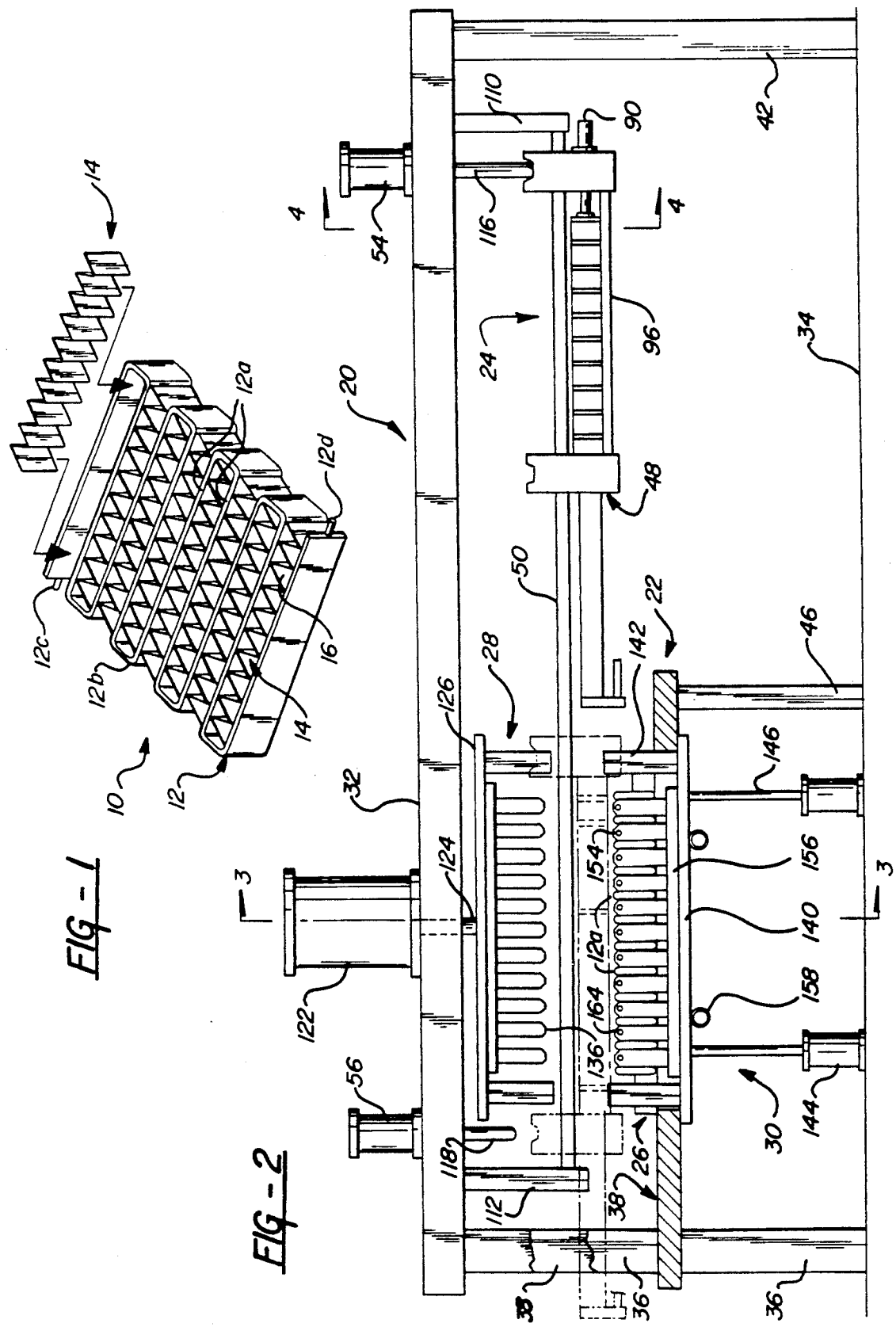

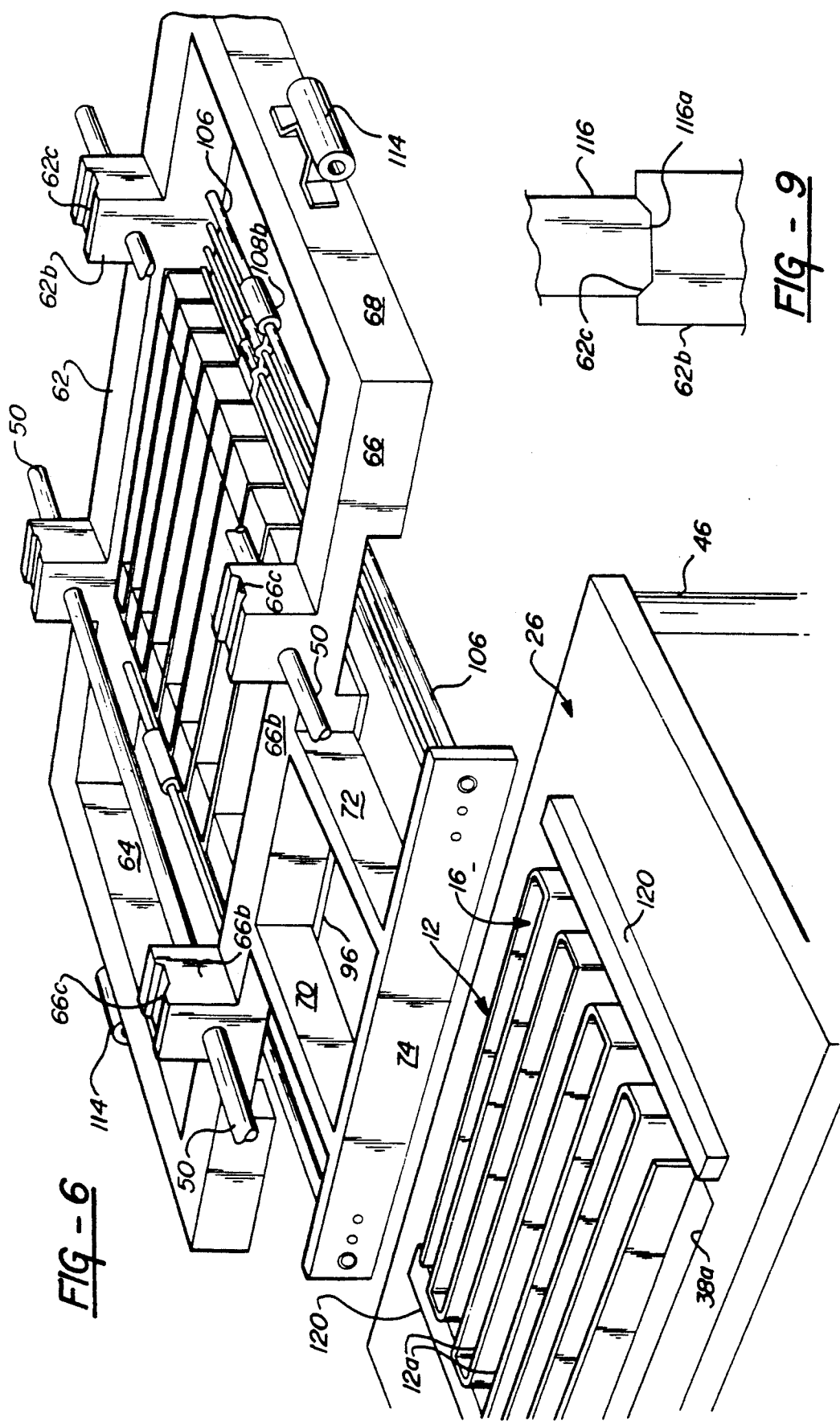

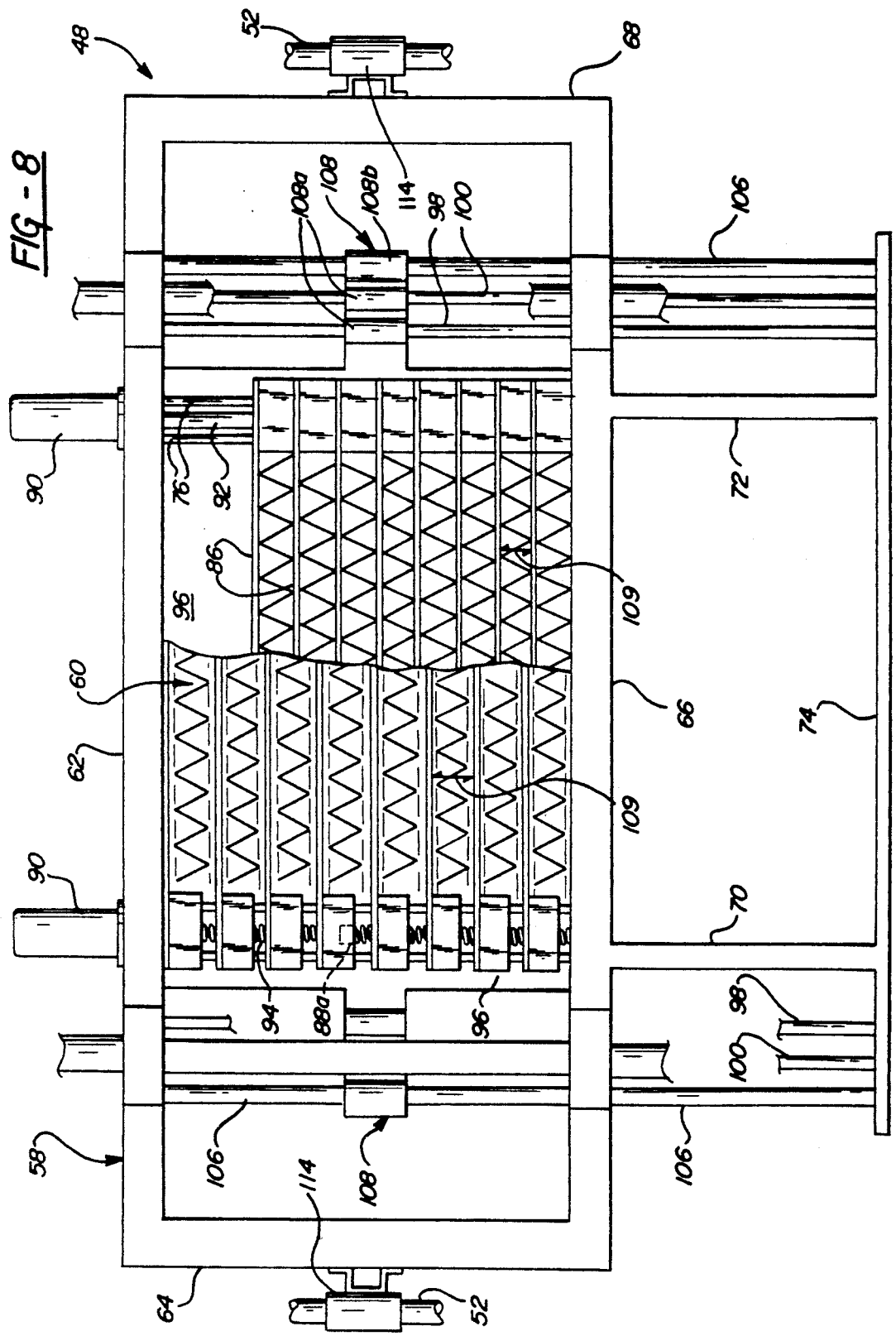

METHOD FOR ASSEMBLING SERPENTINE HEAT EXCHANGERS

FIELD OF THE INVENTION

This invention relates to a method and apparatus for forming serpentine heat exchangers and more particularly to a method and apparatus for inserting fins between the runs of serpentine tubing to form a heat exchanger core.

BACKGROUND OF THE INVENTION

It has been found desirable in heat exchangers, particularly those used for condensers in refrigerator systems, to utilize a serpentine tube configuration. The tubes are flat and are bent to form a plurality of straight runs connected by U-shaped bends whereafter fins or air centers are inserted into the spaces between opposed runs of the tube structure. The tubes thus act as a passageway for the refrigerant and the fins increase the heat transfer capacity of the heat exchanger.

The assembly of the fins between the runs of the tube structure, without special methods and equipment, would be a difficult and time consuming process requiring hand insertion of the fins one at a time. Further, once the fins are assembled into the core they must not move during subsequent handling or brazing. Steel banding straps are typically used to hold the core together until brazing is completed. However, the banding pressures are not transmitted uniformly throughout the entire core. Specifically, the portions of the tube proximate the bends are relatively stiff and resist the externally applied pressure so that the fins in such areas would be loosely held at best. It has been proposed, in U.S. Pat. No. 4,942,654 assigned to the assignee of the present application, to facilitate the insertion of the fins into the spaces between the tube runs by utilizing a special tooling to spread the tube runs slightly whereafter the fins are easily inserted into the spaces between the tube runs whereafter the tube spreaders are removed and the tubes spring back to their original spacing to hold the centers tightly in place. While the method and apparatus of U.S. Pat. No. 4,942,654 have facilitated the heat exchanger assembly process, insertion of the fins into the spaces is still a time consuming process and there is still a danger that the delicate fins may be damaged during this insertion process.

SUMMARY OF THE INVENTION

This invention is directed to the provision of an improved method and apparatus for inserting fins into the tube structure of a serpentine heat exchanger.

According to an important feature of the invention methodology, the blades of one tool assembly are respectively positioned in the spaces between the opposite runs of the serpentine tube structure whereafter the fins are inserted into one side of the spaces by another tool assembly pushing against one edge of each of the fins while the blades are simultaneously withdrawn from the other side of the spaces. This methodology provides a positive automated insertion of the fins into the spaces and also minimizes damage to the fins during the insertion process.

According to a further feature of the invention methodology, the serpentine tube structure is positioned at an assembly station, an array of fins is formed at a location remote from the assembly station, the fin array is shuttled to the assembly station to a position in which the respective fins are positioned opposite the respective spaces of the tube structure, and the respective fins are inserted into the respective spaces. This methodology further facilitates the automatic and efficient insertion of the fins into the tube structure and provides further protection for the fins during the insertion process.

According to a further feature of the invention methodology, a timing structure on one of the tool assemblies is moved into abutting engagement with a timing structure on the other tool assembly as the free ends of the insertion elements of the first tool assembly arrive at a distance from the free ends of the blades of the second tool assembly approximating the thickness of the fins so that the first and second tool assemblies are thereafter moved together in gang fashion to avoid crushing the fins.

According to an important feature of the invention apparatus, means are provided for supporting a serpentine tube structure with the heat exchanger spaces between the sets of adjacent runs of the tube structure open for entry from opposite sides of the spaces; a first tool assembly is positioned on one side of the heat exchanger spaces and mounted for movement toward the heat exchanger spaces to insert fins into the spaces of the serpentine tube structure; and a second tool assembly, including a plurality of spreader blades sized to fit in the heat exchanger spaces, is positioned on the other side of the heat exchanger space and mounted for reciprocal movement to move the spreader blades respectively into and out of the heat exchanger spaces from the other side of the heat exchanger spaces. This apparatus allows the spreader blades to enter the spaces between the runs of the tube structure from one side of the tube structure to spread the tube runs whereafter the tool assembly positioned on the other side of the spaces may be actuated to move the fins into the spread spaces defined by the spreader blades as the spreader blades are withdrawn from the spaces. This arrangement provides for a positive insertion of the fins into the spaces while protecting the fins during all phases of the insertion process.

According to a further feature of the invention apparatus, the apparatus further includes a shuttle defining a plurality of compartments for receipt of respective fins; the first tool assembly includes a plurality of insertion blades sized to fit in the compartments; the shuttle is mounted for movement from a remote fin loading location to a fin insertion location between the first tool assembly and the heat exchanger spaces; and the first tool assembly mounting means is operative following movement of the shuttle to the fin insertion location to move the insertion blades into the compartments and move the fins out of the compartments and into the heat exchanger spaces. This arrangement allows the fins to be loaded at a remote location to facilitate the automation process and further optimizes the protection of the fins during the entire insertion process.

According to a further feature of the invention apparatus, the apparatus further includes timing means including timing structure carried by the first tool assembly coacting with timing structure carried by the second tool assembly and operative in response to arrival of the leading edges of the insertion blades at a distance from the leading edges of the spreading blades generally corresponding to the thickness of the fins to thereafter move the first and second tool assemblies together in gang fashion. This arrangement insures that the fins will be positively and readily inserted into the spread spaces provided by the spreader blades but yet insures that the fin will not be crushed between the insertion blades and the spreader blades.

In the disclosed embodiment of the invention, the timing structure comprises timing pins on the first tool assembly movable into abutting engagement with timing pins on the second tool assembly so as to positively sequence the movements of the upper and lower tool assemblies and positively preclude crushing of the fins between the blades of the upper and lower tool assemblies.

BRIEF DESCRIPTION OF THE DRAWINGS

FIG. 1 perspective view of a serpentine heat exchanger construction in accordance with the method and apparatus of the invention;

FIG. 2 is a side elevational view of the invention apparatus;

FIGS. 5 and 6 are fragmentary perspective views of the invention apparatus;

FIG. 8 is a plan view of the shuttle assembly of FIG. 7;

FIG. 9 is a detail view of a locking mechanism utilized in the shuttle assembly.

DETAILED DESCRIPTION OF THE PREFERRED EMBODIMENT

Figure 3:
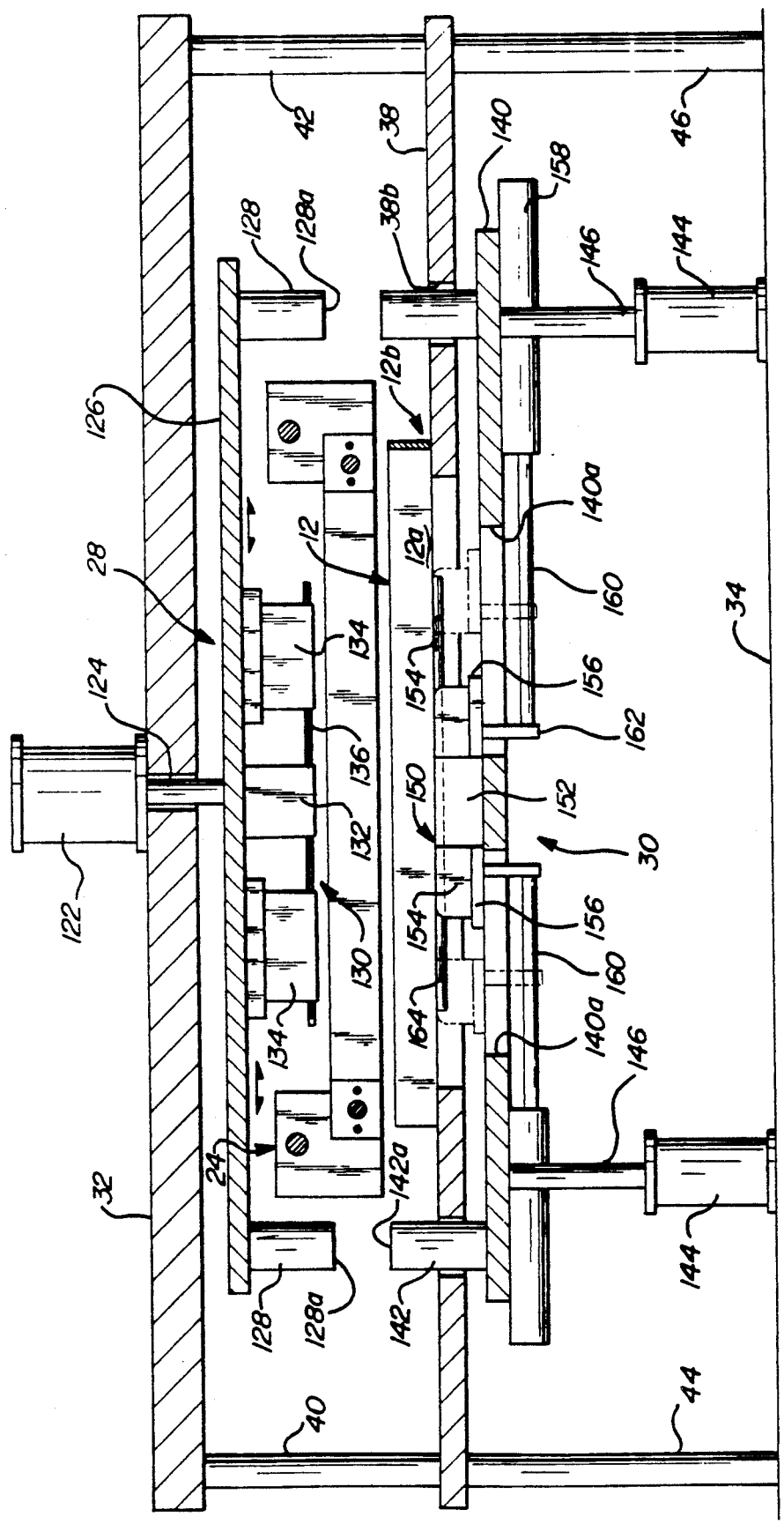
FIGS. 3 and 4 are cross-sectional views taken on lines 3—3 and 4—4 of FIG. 2.
Figure 4:
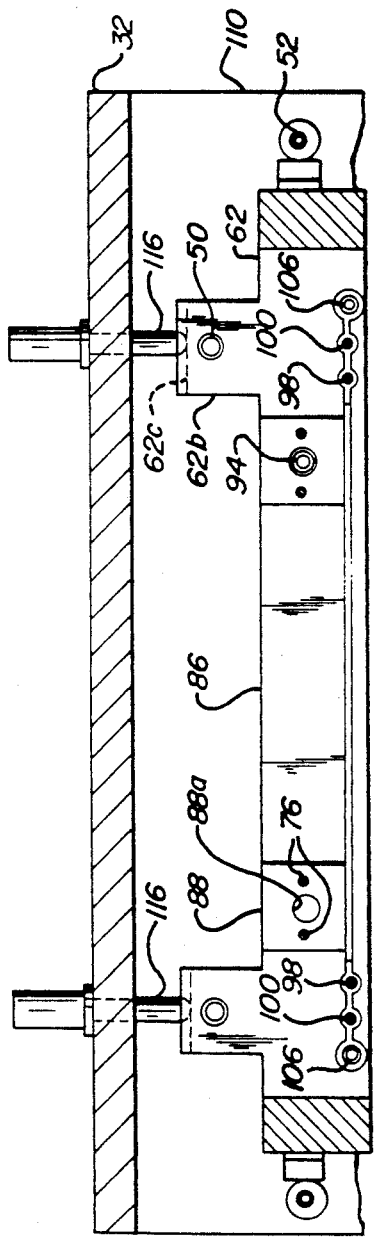
Figure 7:
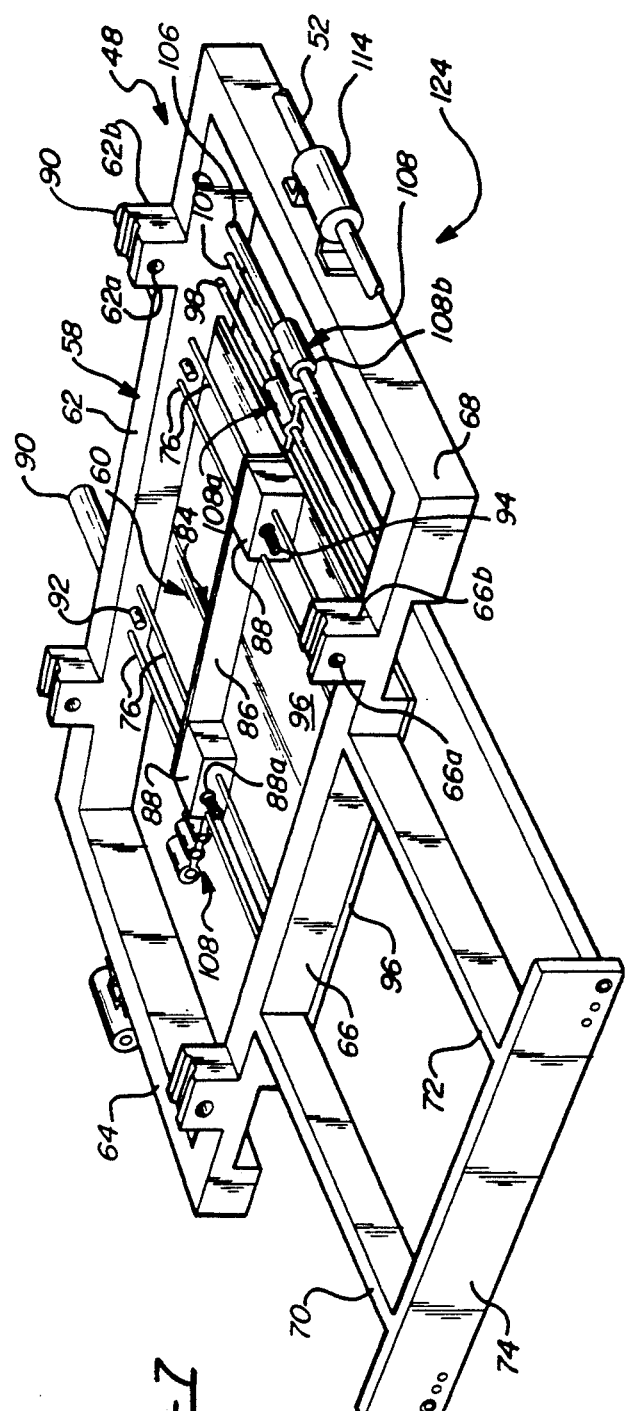
FIG. 7 is a perspective view of a shuttle assembly utilized in the invention apparatus.
Figure 5:
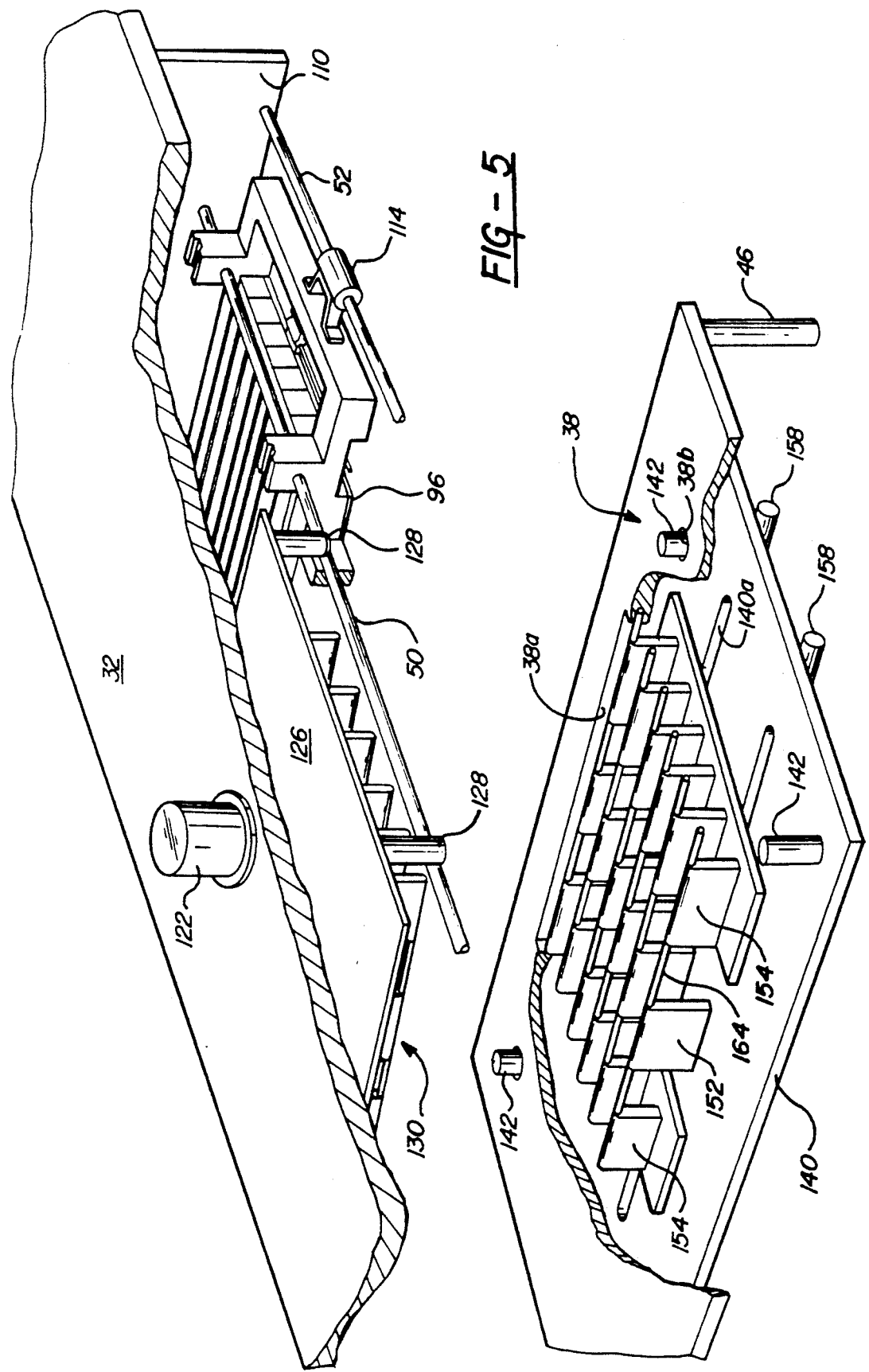

The invention method and apparatus are intended to facilitate the assembly of a heat exchanger 10 of the type including a serpentine tube structure 12 and a plurality of fins or air centers 14 positioned in the spaces 16 between opposite runs of the tube structure. More specifically, the invention method and apparatus is intended to facilitate the insertion of the fins 14 into the spaces 16 whereafter the fins may be brazed or otherwise secured to the tube structure to form the final heat exchanger 10.

Tube structure 12 is formed from flat aluminum tube stock and includes a plurality of parallel runs 12a joined by bends 12b, an inlet 12c, and an outlet 12d.

Fins 14 are formed from aluminum stock and have a thickness slightly exceeding the width of the spaces 16 with the tube structure in a relaxed configuration.

The invention apparatus, broadly considered, includes a main frame 20, a subframe 22, a shuttle assembly 24, a tube positioning assembly 26, an upper tool assembly 28, and a lower tool assembly 30.

Main frame 20 includes a platform 32 supported above a support surface 34 by four corner legs 36, 38, 40 and 42.

Subframe 22 includes a table or platform 38 supported above support surface 34 and below platform 3 by main frame legs 36 and 38 and by table legs 44 and 46.

Shuttle assembly 24 includes a shuttle 48, guide rods 50, air cylinder rods 52, and shot pin cylinders 54 and 56.

Shuttle 48 includes a frame structure 58 and a grate structure 60 mounted on frame structure 58.

Frame structure 58 includes main frame members 62, 64, 66 and 68 forming a generally rectangular frame structure and a subframe mounted on frame member 66 and including longitudinally extending frame members 70 and 72 extending forwardly from frame member 66 and supporting a transverse frame member 74.

Grate assembly 60 includes a plurality of guide rods 76 extending longitudinally between frame members 62 and 66; a plurality of divider assemblies 84 each including a partition plate 86 and spacer blocks 88 at the opposite ends of the partition plate slidably mounted on pairs of guide rods 76; air cylinders 90 mounted on the rear face of frame member 62 and including piston rods 9 projecting through apertures in frame member 62 and forwardly of the frame member for pushing engagement against the partition plate 86 of the rearmost divider assembly 84 so as to selectively push the divider assemblies along the longitudinal path defined by guide rods 76; a coil spring 94 positioned in a recess 88a in the front face of each spacer block 88 and extending forwardly therefrom for engagement with the rear face of the partition plate 86 of the next forwardly divider assembly 84; a floor member 96 positioned slidably beneath the divider assemblies 84; guide rods 98 extending longitudinally between frame member 62 and frame member 74; air cylinder rods 106 extending between frame member 62 and frame member 74; floor brackets 108 secured to the opposite longitudinal edges of floor 96 and each including portions 108a slidably receiving guide rods 98 and 100 and an outboard air cylinder portion 108b slidably mounted on an air cylinder rod 106.

Each air cylinder 108b is formed of a magnetic material for magnetic coaction with a magnetic slug positioned slidably within the respective air cylinder rod 106 so that as the slug is moved longitudinally back and forth within the respective air cylinder rod 106 in response to the admission of pressurized air to the opposite ends of the air cylinder rod the cylinder 108b moves longitudinally along the respective rod 106 in slave fashion to the movement of the slug within the cylinder. The admission of pressurized air into either end of air cylinder rods 106 therefore has the effect of moving the air cylinders 108b longitudinally along the rods 106 with the result that the floor 96 may be moved selectively from a rearward position underlying the divider assemblies 84 to a forward position in which the spaces between the divider assemblies are downwardly open.

Springs 94 normally act to maintain the divider assemblies in the open position seen on the left side of FIG. 8 in which the divider assemblies are in an expanded condition with the rearmost divider assembly pressed against the frame member 62 and adjacent partition plates 86 defining fin insertion compartments 109 therebetween having a width greater than the thickness of the fins. The divider assemblies are moved to the compressed or closed position seen on the right-hand side of FIG. 8 upon actuation of air cylinders 90 to extend piston 92 and push the divider assemblies forwardly along the guide rods 76 to a position in which the springs 94 are compressed to an extent to allow the front face of each spacer block 88 to abuttingly engage the rear face of the partition plate 86 of the next forwardly divider assembly. In the compressed or closed position of the divider assemblies, the compartments 109 defined between adjacent partition plates 86 have a width approximating the thickness of the fins.

Guide rods 50 extend longitudinally between a rear mounting bracket 110 extending downwardly from main frame platform member 32 to a front mounting bracket 112 extending downwardly from platform member 32. Guide rods 50 pass slidably through apertures 62a in tower portions 62b of shuttle frame member 62 and through apertures 66a in tower portions 66b of shuttle frame member 66 so as to mount the shuttle for longitudinal movement along the guide rods 50 between the rearward or fin loading position seen in solid lines in FIG. 2 to the forward or fin insertion position seen in dotted lines in FIG. 2.

Air cylinder rods 52 also extend between brackets 110 and 112 and pass through air cylinder 114 mounted on the outboard faces of shuttle frame members 64 and 68 respectively. Cylinders 114 are formed of magnetic material and magnetically coact with magnetic slugs positioned slidably within air cylinder rods 52 so that the cylinders 114 are moved longitudinally along rods 52 in response to the introduction of pressurized air into the opposite ends of air cylinder rods 52 so as to move the shuttle back and forth between its rearward fin loading position and its forward fin insertion position.

Shot pin cylinders 54 and 56 act to precisely define the rearward and forward positions of the shuttle. Specifically, with the shuttle positioned in its rearward solid line position of FIG. 2, shot pin 54 may be actuated to move the piston 116 of the shot cylinder downwardly and move the contoured lower end 116a of the cylinder into precise seating engagement with a correspondingly contoured positioning groove 62c provided on the upper face of a tower portion 62b of shuttle frame member 62. It will be understood that there are two rearward shot pins 54 for coaction with the two tower portions 62b of shuttle frame member 62 so as to provide positive and precise positioning of the shuttle in its rearward or fin loading position.

Similarly, a pair of shot cylinders 56 include piston rods 118 coacting with grooves 66c in the tower portions 66b of shuttle frame member 66 to define the precise forward or fin insertion position of the shuttle.

Tube positioning assembly 26 includes a window 38a formed in table top 38 and a pair of clamp members 120 mounted on the upper face of table top 38. It will be understood that serpentine tube structure 12 is positioned on top of table top 38 in overlying relation to window 38a such that the spaces 16 between the runs 12a of the tube structure are open from both the top side and the bottom side of the tube structure and the tube structure is held securely in its position over the window 38a by clamps 120 which are movable by actuation means (not shown) between clamping positions in engagement with the opposite edges of the tube structure and withdrawn positions to enable the tube structure to be positioned over the window 38a and to enable the completed heat exchanger to be removed from the table surface.

Upper tool assembly 28 includes a cylinder 122 mounted on the upper face of platform member 32 and including a piston rod 124 extending downwardly through an aperture in the platform member 32; a platen or carrier member 126 secured to the lower end of piston rod 124; timing pins 128 projecting downwardly from the outboard corners of platen 126; and a plurality of insertion blade assemblies 130 mounted on the lower face of platen 126 in parallel longitudinally spaced relation.

Each insertion blade assembly 130 includes a central blade 132 mounted fixedly and centrally on the underface of platen 126 and a pair of outboard blades 134 aligned with central blade 132 and each mounted by means (not shown) for selective inboard and outboard movement relative to central blade 132 to Vary the effective overall dimension of the blade assembly to accommodate tube structures of varying sizes. A rod 136 is secured to the lower edge of central blade 132 and is received in downwardly opening grooves in the lower edges of outboard blades 134 so as to guide the blades 134 in their relative outboard and inboard movement to adjust the blade assemblies to accommodate various sizes of tube structures. Blades 132, 134 have a thickness slightly less than the width of fins 14 and slightly less than the width of compartments 109 with the divider assemblies in the compressed condition seen on the right-hand side of FIG. 8. The lower or leading edges of the blades 130,132 are tapered to facilitate entry of the blades into the spaces between adjacent partition plates 86.

Lower tool assembly 30 includes a platen or carrier 140, a plurality of timing pins 142 extending upwardly from the outboard corners of platen 140 and passing through apertures 38b in table 38 and aligned respectively with the four timing pins 128 projecting downwardly from the platen 126 of the upper tool assembly 28; a plurality of air cylinders 144 positioned beneath platen 140 and including piston rods 146 engaging the underface of the platen so as to selectively raise and lower the platen in response to actuation of the cylinders; and a plurality of spreader blade assemblies 150 positioned on the upper face of platen 140 in longitudinally spaced relation and corresponding in number and spacing to the insertion plate assemblies 130 projecting downwardly from the platen 126 of the upper tool assembly.

Each spreader blade assembly 150 includes a fixed central upstanding blade 152 and a pair of outboard blades 154 mounted on carrier plates 156 for selective inboard and outboard movement relative to the central blade member 152. The inboard and outboard movement of outboard blade members 154 is accomplished by power cylinders 158 secured to the underface of platen 140 and including piston rods 160 engaging lugs 162 extending downwardly from carrier plates 156 and slidably guiding in slots 140a in the platen 140. A rod 164 is secured to the upper edge of each fixed central blade 152 and is slidably positioned in upwardly opening grooves in the upper edges of the corresponding outboard blades 154 so as to slidably guide the inboard and outboard movement of the outboard blades in response to actuation of the cylinders 158. Blades 152,154 have a width slightly greater than the width of the spaces 16 between the tube structure runs 12a with the tube structure in a relaxed condition. The upper or leading edges of the blades 152,154 are tapered to facilitate the prying, spreading entry of the blades into the spaces 16.

OPERATION

The description of the operation of the invention apparatus commences with the shuttle 24 in the rearward or withdrawn position seen in solid lines in FIG. 2; the piston rods 116 of shot cylinders 54 extended to lockingly engage the grooves 62c in the upper face of the tower portions 62b of shuttle frame member 62 to positively and precisely position the shuttle in its withdrawn or loading position; the floor 96 in its rearward position underlying divider assemblies 84; the piston rods 92 of cylinders 90 retracted to allow the divider assemblies to assume their expanded, open position under the urging of springs 94; the upper tool assembly 28 in the raised position seen in FIG. 2; the lower tool assembly in the lowered position seen in FIG. 3 wherein the upper edges of the blades 152,154 are essentially flush with the upper face of table 38; and the outboard blades 154 of the blade assemblies 150 positioned in their solid line relatively inboard positions seen in FIG. 3 in abutting engagement with central blades 152.

Air cylinders 144 are now actuated to move lower tool assembly 30 to the raised position seen in FIG. 2 wherein the upper edges of the blades 152,154 of the spreader blade assemblies 150 are positioned above the upper face of table 38 by a distance corresponding generally to the thickness of serpentine tube structure 12; a previously formed serpentine tube structure 12 is placed over the spreader blades 152,154 with the spaces 16 between the opposed runs 12a of the tube structure respectively aligned with the various blade assemblies; the tube structure is pressed downwardly over the spreader blade assemblies into engagement with the top surface of table 38 so that the upper portions of the spreader blade assemblies enter the spaces 16 from the lower ends of the spaces and move upwardly into the spaces with a spreading action to slightly spread the adjacent runs 12a relative to their natural or relaxed spacing; clamps 120 are suitable actuated to engage the opposite edges of the tube structure and firmly lock the tube structure in its position on the table top; cylinders 158 are actuated to move the outboard spreader blades 154 outboard relative to the fixed central blades 152 so as to increase the spreading action outwardly to a location proximate the bends 12b of the tube structure; a plurality of fins 14 are loaded into the compartments or spaces defined between the partition blades 86 of adjacent divider assemblies 84 of the shuttle; cylinders 90 are actuated to extend piston rods 92 and move the divider assemblies to their compressed condition as seen on the right-hand side of FIG. 8 and thereby firmly grasp the fins between adjacent partition plates 86; piston rods 116 of shot pin cylinders 54 are withdrawn and compressed air is admitted into air cylinder rods 52 in a sense to move the shuttle 24 from its retracted position as seen in solid lines in FIG. 2 to the dotted line position of FIG. 2 in which the compartments defined between the partition plates 86 respectively underlie the insertion blade assemblies 130 of the upper tool assembly and respectively overly the spaces 16 of the tube structure and the spreader blade assemblies 150 of the lower tool assembly; shot pin cylinders 56 are actuated to lower piston rods 118 into positioning engagement with the positioning grooves 66c on the upper faces of tower portion 66b of shuttle frame member 66 and thereby firmly and positively lock the shuttle in its forward or fin insertion position; compressed air is admitted to air cylinder rods 106 in a sense to move floor 96 from its rearward position underlying divider assemblies 84 to its forward position in which the divider assemblies are downwardly open; hydraulic cylinder 122 is actuated in a sense to lower the upper tool assembly 28 and move the insertion blade assemblies 130 downwardly into engagement with the upper edges of the fins 14; the downward movement of the upper tool assembly is continued until blade assemblies 130 enter compartments 109 and the fins begin to move downwardly out of the compartments under the urging of blades 132, 134 and rods 136 and approach the upper edges of spreader blade assemblies 150 whereupon the lower faces 128a of upper timing pins 128 engage the upper faces 142a of lower timing pins 142 so that further downward movement of the upper tool assembly is accompanied, in gang fashion, by equal downward movement of the lower tool assembly to avoid crushing the fins therebetween; and the downward movement of the upper and lower tool assemblies under the impetus of hydraulic ram 122 continues until the spreader blades of the lower tool assembly have been completely withdrawn from the spaces 16 between the opposed tube runs and the fins have been completely inserted into the spaces 16.

Figure 10:
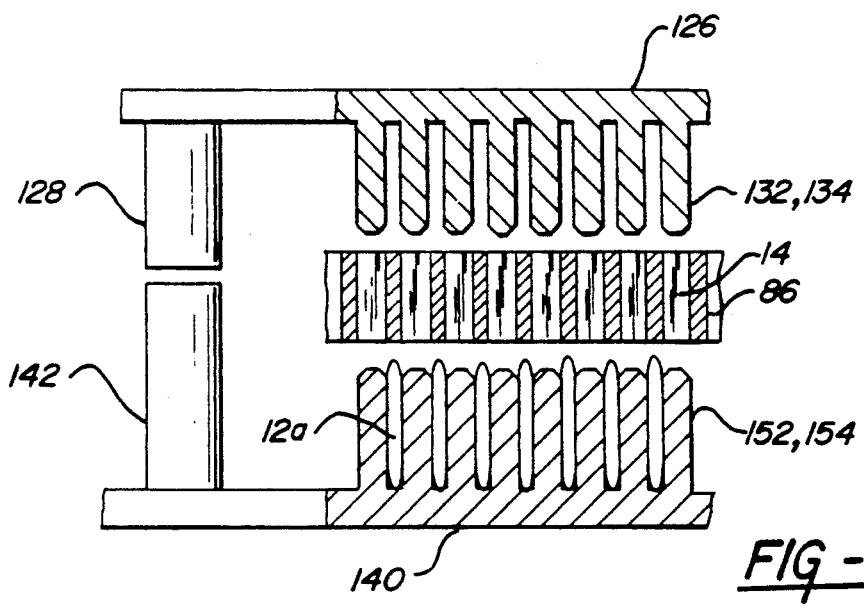
FIGS. 10, 11 and 12 are sequential views showing steps in the operation of the invention apparatus and in the performance of the invention method.
Figure 11:
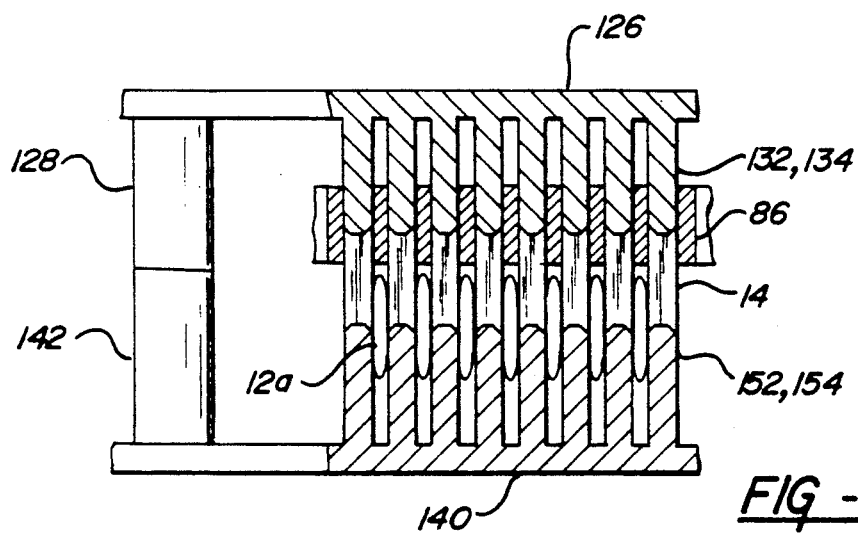
Figure 12:
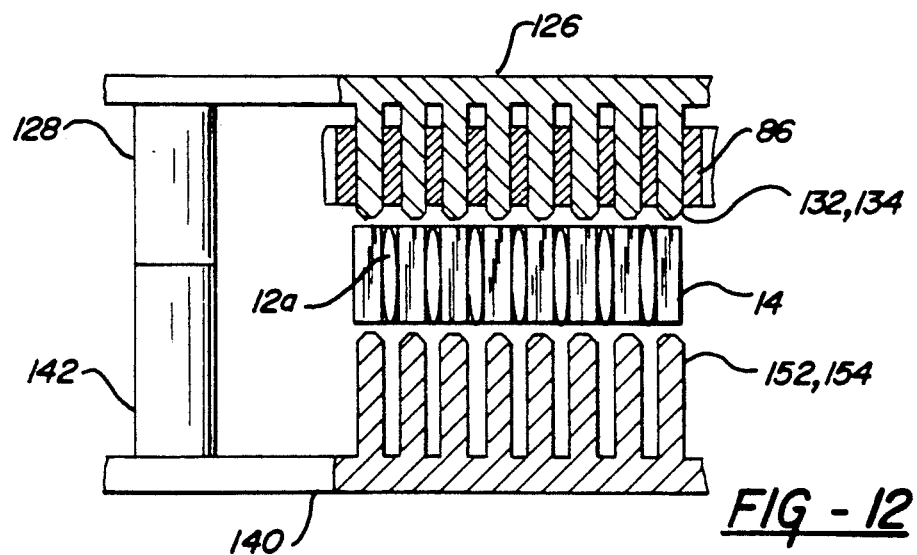

The operational sequence of the apparatus during the tube insertion process is seen in FIGS. 10, 11 and 12. It will be understood that the hydraulic ram 122 overcomes the air cylinders 144 during the downward movement of the tool assemblies due to the superior downward force generated by the hydraulic ram as opposed to the inferior upward force generated by the air cylinders. It will further be understood that the tube runs contract inwardly as the spreader blades are withdrawn to firmly grasp the fins as they are being inserted by the insertion blades; that the downward pushing movement of the insertion blade assemblies against the upper edges of the fins is augmented and facilitated by the engagement of the guide rods 130 with the upper edges of the fins; and that the fins in their fully inserted position within the tube structure are further supported at their lower edges by the guide rods 164 of the spreader blade assemblies.

After the fins have been totally inserted into the spaces 16 of the tube structure, cylinders 144 are exhausted and ram 122 is actuated in a sense to raise the upper tool assembly to a position where the lower edges of the insertion blades of the upper tool assembly are clear of the shuttle 24, whereafter the piston rods 116 of the shot pin cylinders 56 are raised to release the shuttle and compressed air is admitted to air cylinder rods 52 in a sense to move the shuttle back to its withdrawn or fin loading position.

As the shuttle moves back to its withdrawn or fin loading position, compressed air is admitted to air cylinder rods 106 in a sense to move floor 96 forwardly into its underlying position relative to the divider assemblies and air cylinders 90 are actuated in a sense to withdraw piston rods 92 and allow the springs 94 to expand to move the divider assemblies to the expanded, loading position seen in the left-hand side of FIG. 8 so that, as the shuttle arrives at the withdrawn or loading position and the piston rods 116 of shot pin cylinders 54 are extended to precisely position and lock the shuttle in its loading position, the shuttle compartments may be immediately loaded with a new array of fins 14 for insertion into the spaces 16 defined by the next tube structure.

After the shuttle has been moved to its withdrawn position, the completed heat exchanger may be removed from the table 38, whereafter cylinders 158 of the lower tool assembly may be actuated in a sense to move the outboard spreader blades 154 inwardly relative to the fixed central spreader blades 152 whereafter the cylinders 144 may again be actuated to raise the spreader blades preparatory to the placement of a new tube assembly 12 on the table 38 over the raised spreader blades.

The invention method and apparatus will be seen to have many important advantages as compared to the prior art methods and apparatus. Specifically, the movement of the divider assemblies of the shuttle to the compressed or closed position seen on the right-hand side of FIG. 8 in combination with the positive positioning and locking engagement of the piston rods of the shot pin cylinders 52 with the shuttle, has the effect of precisely positioning the fins with respect to the respective spaces 16 defined in the associated tube structure so that the subsequent insertion process upon downward movement of the upper tool assembly is clean and positive with each fin 14 entering precisely on center with respect to the associated space 16; the fins 14 are protected during the entire insertion process so as to preclude inadvertent damage to the delicate fin structure and specifically, as best seen in FIGS. 10, 11 and 12, the fins at all times during the insertion process are embraced on all sides by protective structure; the fins are precluded from compressive damage during the insertion process by the precise, timed engagement of the timing pins on the upper tool assembly with the timing pins on the lower tool assembly; and the inserted fins are held firmly between the opposed runs of the tube structure as the adjacent runs of the tube structure close up against the respective fins in response to the withdrawal of the spreader blade assemblies so as to facilitate the subsequent brazing operation to form the final heat exchanger.

Whereas a preferred embodiment of the invention has been illustrated and described in detail it will be apparent that various changes may be made in the disclosed embodiment without departing from the scope or spirit of the invention. For example, although the invention has been described with reference to a heat exchanger embodying a single serpentine tube structure, the invention has equal applicability to a heat exchanger embodying two serpentine tube structures nested together to form a two passage serpentine structure as shown, for example, in assignee's U.S. Pat. No. 4,942,654.

I claim:

1. A method of installing fins in spaces between adjacent runs of a serpentine tube structure to form a heat exchanger comprising the steps of:
   providing a plurality of variable width compartments proximate the tube structure;
   aligning each compartment with a respective space between the runs including the step of adjusting the width of each compartment;
   positioning a fin in each compartment; and
   moving the fins out of the compartments and into the respective spaces.

2. A method according to claim 1 wherein the step of positioning the fins comprises:
   positioning the fins in the compartment at a location remote from the structure; and
   moving the compartments containing the fins to be proximity of the tube structure for inserting the fins into the spaces.

3. A method according to claim 2 wherein the steps of aligning each compartment and of positioning the fins further comprises:
   spreading the compartments to form relatively wide compartments;
   placing the fins into the compartments; and
   thereafter closing up the compartments to provide fin distances corresponding to the distance between the spaces of the tube structure.

4. A method of inserting fins into spaces between adjacent runs of a serpentine tube structure to form a heat exchanger comprising the steps of:
   positioning blades of one tool assembly in the spaces between adjacent runs;
   aligning a fin with one side of each space;
   inserting the fins into the one side of the spaces by simultaneous steps of a) pushing against one edge of each of the fins with another tool assembly and b) withdrawing the blades of the one tool assembly in timed relation to the pushing action of the other tool assembly.

5. A method according to claim 4 wherein the other tool assembly includes individual blades, and the step of pushing against one edge of each of the fins comprises engaging an edge of each of the fins with an individual blade.

6. A method according to claim 4 wherein the step of inserting comprises:
   initially moving the other tool assembly independently of any movement of the one tool assembly to begin movement of the fins toward the blades of the one tool assembly; and
   subsequently moving the one tool assembly jointly with the other tool assembly.

7. A method according to claim 4 wherein the step of aligning a fin with one side of each space comprises;
   forming an array of fins at a station remote from the said tool assemblies by spacing the fins to correspond to the spaces of the adjacent runs of the tube structure; and
   shuttling the fin array to a position aligning the fins with the spaces of the tube structure.

8. A method of assembling a serpentine style heat exchanger of the type including a serpentine tube structure defining spaces between adjacent runs of the tube structure and fins positioned in the spaces, comprising the steps of:
   spreading the adjacent runs by inserting a first step of blades into the spaces from one side of the spaces to slightly spread the opposed runs;
   positioning a fin proximate the other side of each space; and
   inserting the fins by moving a second set of blades into engagement with the fins to move the fins into the other sides of the spaces simultaneously withdrawing the first set of blades from the one side of the spaces.

9. A method according to claim 8 wherein the first set of blades is mounted on a first carrier and the second set of blades is mounted on a second carrier, including the step of:
   providing mutually aligned timing spacers on the carriers for limiting the approach of one set of blades to the other step to a distance approximating the fin thickness; and
   abutting the spacer of the first carrier with the spacer of the second carrier during the inserting step to maintain the minimum distance between the first set of blades and the second set of blades at approximately the thickness of the fins to avoid crushing the fins.

* * * * *